United States Patent [19]

Hicter et al.

[11] 4,325,539
[45] Apr. 20, 1982

[54] DEVICE FOR TREATING A MOLTEN METAL OR ALLOY USING LIQUID AND SOLID FLUX

[75] Inventors: Jean-Marie Hicter, Coublevie-Voiron; Pierre Guerit, Chambery, both of France

[73] Assignee: Societe de Vente de l'Aluminium Pechiney, Paris, France

[21] Appl. No.: 122,520

[22] Filed: Feb. 19, 1980

Related U.S. Application Data

[62] Division of Ser. No. 61,023, Jul. 26, 1979, Pat. No. 4,295,884.

[30] Foreign Application Priority Data

Jul. 31, 1978 [FR] France .................. 78 23197

[51] Int. Cl.³ .................................. C22B 9/02
[52] U.S. Cl. .................. 266/207; 266/227; 266/236; 75/68 R
[58] Field of Search ........ 266/200, 207, 227, 229–231; 75/68 R, 93 AC, 257, 68, 236

[56] References Cited

U.S. PATENT DOCUMENTS

| | | | |
|---|---|---|---|
| 1,357,782 | 11/1920 | Koppers | 266/200 |
| 1,472,006 | 10/1923 | Jones | 266/200 |
| 3,528,801 | 9/1970 | Bylund et al. | 75/93 R |
| 3,907,962 | 9/1975 | Ogiso | 266/200 |

FOREIGN PATENT DOCUMENTS 1148344 4/1969 United Kingdom .................... 75/68

*Primary Examiner*—M. J. Andrews
*Attorney, Agent, or Firm*—Dennison, Meserole, Pollack & Scheiner

[57] ABSTRACT

The invention provides apparatus for treating a molten metal or alloy using liquid and solid flux, the invention comprising apparatus for passing the metal or alloy through a column provided with an outlet siphon lined with solid granules and liquid flux, at least a proportion of the granules comprising a solid flux having a melting point which is higher than that of the liquid flux and which is higher than the temperature of the metal to be treated. The solid granules can be introduced in a removable interchangeable cartridge. The invention finds utility in the advanced purification of aluminum-based alloys by elimination of ultimate inclusions.

7 Claims, 3 Drawing Figures

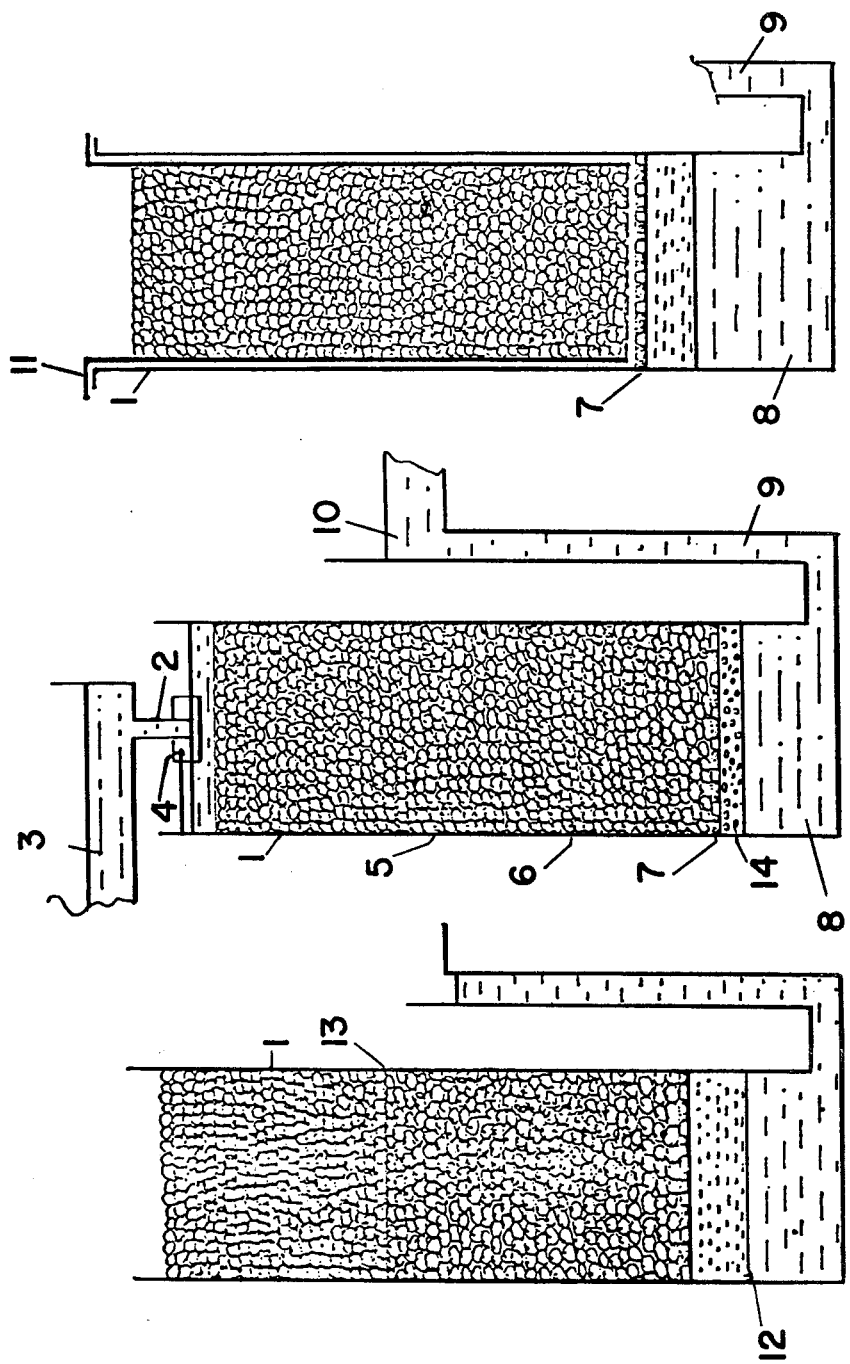

DEVICE FOR TREATING A MOLTEN METAL OR ALLOY USING LIQUID AND SOLID FLUX

This is a division of application Ser. No. 061,023, filed July 26, 1979 now U.S. Pat. No. 4,295,884.

BACKGROUND OF THE INVENTION

The present invention relates to a process and device for the treatment of a molten metal or alloy by passing it through a complex bed formed from granules of solid flux immersed in a bath of liquid flux. It is used particularly in the founding of light metals and alloys and, in particular, of aluminium and it alloys, magnesium and its alloys and of some other metals whose fairly low melting points are compatible with the use of conventional metal halide based fluxes such as lead, tin or zinc.

Hereinafter, the word "treatment" will designate all the operations to which the raw molten metal or alloy is subjected before it is used in the foundry in order to eliminate the impurities and, in particular, the inclusions which would impair the properties of the cast articles. These operations can be of a purely physical nature such as filtration or a physico-chemical nature such as the placing in contact with fluxes.

The need to filter the metal so as to obtain sound articles which are free from defects has been recognized both in the founding of articles and in the semicontinuous casting of plates, billets or ingots and in continuous casting. In practice, mechanical filtration has been combined with "washing" using a flux which usually constitutes one or more halides of molten alkali and alkaline earth metals which makes it easier to "wet" the inclusions and to collect them in the form of slag.

The inclusions which are not wetted by the metal and are wetted by the flux arriving at an interface thus created between the molten and the liquid flux are trapped at this interface and penetrate the liquid flux. They are removed from the molten metal during this "washing."

The more developed the interface between the molten metal and liquid flux (fine dispersion or emulsion) and the more the liquids are mixed, the more effective is the treatment carried out for a given quantity of molten metal to be treated and a given quantity of flux, owing to the renewal of the liquids in the vicinity of the interface.

Numerous patents describe processes and devices allowing a metal to be both washed by a flux and filtered through porous masses.

In particular, it is possible to cite U.S. Pat. Nos.: 2,863,333, 3,006,473, 3,010,712, 3,025,155, 3,039,864, 3,172,757, 3,821,238, 3,737,305 in the name of Alcoa, British Pat. No. 1,266,500 and French Pat. No. 2,061,246 in the name of Baco (British Aluminium Company), French Pat. Nos. 1,254,899 and 1,258,674 and British Pat. No. 1,148,344 of Foseco, U.S. Pat. No. 3,227,547 of Union Carbide.

All these patents propose different arrangements for making it easier to bring the metal and liquid flux into contact so as to prevent the slag from being entrained toward the casting ladle and to make the metal pass through solid filtering compositions. We have not mentioned as prior art those patents in which a gas which is sometimes chlorinated is injected into the molten metal.

The various processes enumerated above either involve carrying out mere physical filtration or producing a dispersion of flux in the molten metal and stirring it by mechanical means or by bubbling an inert or active gas through it. These processes have been considered satisfactory for numerous years. At present, however, the requirements of aeronautical design, of thin strips for cans, of thin sheets, of fine wires are forcing the producers of semi-finished products made of metals and light alloys to improve the quality infinitely, and the refining of methods of analysis has shown that the microscropic inclusions, which had been considered negligible up until now, could impair certain mechanical characteristics and increase the amount of waste and, sometimes, render certain advanced thermal treatments, carried out in the vicinity of the melting point of the eutectic constituents of the alloys, inoperative or even harmful.

SUMMARY OF THE INVENTION

The present invention allows metal to be obtained which is much cleaner than that obtained by the known processes.

It concerns, in the first instance, a process for the treatment of a molten metal using a metal halide based flux which involves introducing the metal at the top of a column provided with a complex bed formed from solid granules immersed in a liquid flux, at least a portion of the granules being constituted by solid flux. The solid flux and the liquid flux are formed by one or more sodium, potassium, lithium, calcium, barium, magnesium or aluminum halides, the melting point of the solid flux being higher than the melting temperature of the liquid flux and than the temperature of the metal to be treated.

The solid flux can be placed in a removable cartridge which is inserted in the column in order to make it easier to renew the solid flux quickly.

It concerns, secondly, a device for carrying out the above-mentioned process comprising a column provided at its upper part with a device for introducing the molten metal and, at its lower part, a syphon for extracting the treated metal, the upper orifice of which has a difference in level relative to the device for introducing the metal which is at least equal to the loss of charge undergone by the molten metal as it passes through the column. Moreover, the cross-section of the outlet syphon is preferably smaller than the cross-section of the column.

The device can also comprise a removable, interchangeable cartridge which is inserted into the column and whose bottom is perforated and it can also comprise an obturating means.

It can also comprise a means of sheltering the molten metal from the air or under the cover of inert gas.

One of the essential elements of the invention is the combination of a liquid flux and a granulated solid flux so as to form the complex treatment bed.

The liquid flux is composed of one or several halides, essentially chlorides and/or fluorides, of alkali and/or alkaline earth metals as well as of magnesium and/or aluminum and/or of complex salts such as lithium, sodium or potassium cryolite.

The solid granulate can be composed, totally or only partially, of solid flux. In this case, it has a similar chemical composition, but its melting point must be higher than the melting temperature of the liquid flux and the temperature of the metal to be treated. Its density can be equal to, lower than or higher than that of the liquid flux, the granulates tending to collect at the top or the bottom of the treatment vessel without affecting the effectiveness of the treatment. A sufficient quantity of granules to fill almost all the column is initially introduced and the liquid flux positions itself in the gap. The granules can be spheres obtained by conventional methods such as pelletizing, with diameters which can range from about 2 to 15 mm, or granulates having varying shapes and sizes which are obtained by any known methods of agglomeration.

In particular, it is possible to obtain irregular, angular shapes by crushing spherical granules. These granules can be solid or porous. In the latter case, it is possible to introduce during their moulding an additive which will subsequently be eliminated by selective evaporation or dissolution. Very varied shapes can be obtained by pelletizing, extrusion of a paste, compaction, for example in a ball press. It is also possible for a proportion of the solid granulate to be constituted by a material which is inert toward the metal to be treated and the constituents of the flux, for example alumina, silicon-carbide, siliconoxynitride, carbon or various aluminous or silico-aluminous refractory materials or other materials which are stable towards the molten metal. These inert granulates therefore serve only to disperse the molten metal so as to multiply the surfaces of contact between the molten metal on the one hand and the solid and liquid constituents of the flux on the other hand.

Similarly, a solid granulate can be constituted by an inert core coated with active solid flux, all the arrangements which have just been described in a non-limiting manner having the aim of providing a contact surface which is as large as possible with the metal to be treated.

To sum up, it is possible to use four types of granules in this process:
- active granules which are homogeneous and used alone,
- activated granules which are used alone,
- mixed granules, that is to say, granules containing active elements and inert elements and which would be used alone,
- inert granules which are always used in a mixture with active granules.

The chemical compositions of the solid flux and the liquid flux must be compatible so that the service life of the granules of solid flux inside the liquid flux is at least equal to the duration of the treatment of the metal.

The following compositions have been quite satisfactory both with regard to the activity and with regard to the service life. They are given as a non-limiting example. Their composition is given as a percentage by weight:

FIG. 2 shows a treatment column under the operating conditions, placed between the outlet of the smelting furnace and the inlet of a casting installation.

FIG. 3 shows a removable cartridge device allowing the granules to be renewed quickly.

DESCRIPTION OF THE PREFERRED EMBODIMENTS

When the treatment column 1 is in operation (FIG. 2), it receives through the nozzle 2 at its upper portion the metal to be treated 3 which disperses over the entire useful cross-section of the column 1. A float 4 or any other similar device allows the intake and consequently the level of the metal to be treated to be monitored.

Any known device which allows the molten metal to be placed under protection from the air or under the cover of inert gas can be provided at this level.

From the top of the column, the metal flows under gravity through the liquid flux 5, dispersing into a multitude of droplets over the solid lining 6.

As this dispersion is one of the essential elements of the invention, it can be improved in various ways, for example by enlarging the diameter of the float 4 to a dimension which is approximately equal to the diameter of the column 1 and by making a large number of holes of small diameter at its lower portion so that the molten metal to be treated is supplied in an almost homogeneous manner over the entire inlet surface of the column. Any tendency to "loop," that is to say the phenomenon under which the metal would pass through the column from top to bottom by a small number of preferential courses, omitting large dead zones and thus reducing the effectiveness of the treatment, is avoided.

At the lower portion of the column 1, a grid 7 stops the granules and allows droplets of metal to pass and to collect at 8 where they coalesce, thus continuously supplying the syphon 9 through which the treated metal is withdrawn and directed toward the casting installation 10.

Owing to the combined action of stirring, the contact with the fine streams of metal, the chemical reactions and their gradual fusion or dissolution in the liquid flux, the granules tend to be consumed and to be used up. It might be possible to add more periodically. However, it is particularly advantageous to introduce the granules in a removable cartridge 11 which can easily be interchanged.

Therefore, while a treatment is under way, it is sufficient to keep one or more spare cartridges in reserve, at

|  | A |  | B |  | C |  | D |  | E |  |
|---|---|---|---|---|---|---|---|---|---|---|
| Solid | $AlF_3$ | 45% | $AlF_3$ | 45% | $CaF_2$ | 50% | $AlF_3$ | 41% | $AlF_3$ | 55% |
| Flux | $CaF_2$ | 55% | $MgF_2$ | 55% | $MgF_2$ | 50% | $CaF_2$ | 59% | $MgF_2$ | 45% |
| Liquid | NaCl | 50% | $MgCl_2$ | 40% | $MgCl_2$ | 50% | KCl | 30% | $MgCl_2$ | 50% |
| Flux | KCl | 45% | KCl | 40% | KCl | 30% | NaCl | 50% | KCl | 30% |
|  | $CaF_2$ | 5% | $K_3AlF_6$ | 20% | $CaF_2$ | 10% | $CaF_2$ | 10% | $AlF_3$ | 10% |
|  |  |  |  |  | $MgF_2$ | 10% | $AlF_3$ | 10% | $MgF_2$ | 10% |

The following figures and embodiments allow the methods and conditions for carrying out the invention to be specified.

BRIEF DESCRIPTION OF THE DRAWINGS

FIG. 1 shows a treatment column before operation provided with granules of solid flux, into which has firstly been introduced some molten metal then some liquid flux so as to prime the syphon.

the desired temperature, and to exchange them at predetermined intervals of time or after a predetermined quantity of metal has passed. The liquid flux can be withdrawn so that it can be renewed by various means, for example by means of an orifice arranged at the lower portion of the column.

It would also be possible to provide the bottom of the column with a perforated tube allowing a neutral treatment gas (nitrogen, argon) or active gas (chlorinated gas) to be injected as needed. Apart from the possible chemical action of the gas, this would result in additional stirring of the granules within the liquid flux. However, this arrangement does not seem to be necessary in practice.

EXAMPLE

A treatment column for aluminum and its alloys having a diameter of 70 cm and a height of 120 cm was produced. The syphon outlet is 250 mm below the level at which the molten metal enters. The lining of the solid flux occupies approximately 60% of the total volume.

When starting up, the molten metal is introduced over a height of about 10 cm to the level 12 and the liquid flux is then introduced over a height of about 60 cm to the level 13 in order to prime the syphon. The column is thus ready to operate and the liquid aluminum to be treated 3 which originates from the smelting furnace is introduced. The level of the molten metal-liquid flux dispersion reaches about 100 cm and is stabilised by regulating the supply by means of the float nozzle assembly. The coalescence zone of the metal is at level 14. The intake of the metal to be treated and the syphon output of treated metal is thus balanced continuously.

This column allows a flow rate of metal which can be as high as 30 tons per hour for aluminum, without this flow rate appearing to be a limit due to the geometry of the column or the speed of passage of the metal in the column. The only limitation is due to the difference of level between the metal inlet and outlet which is usually imposed in industrial use by the position of the smelting furnace and the casting installation.

The cross-section of the outlet syphon 9 is small relative to that of the column 1 so that a slight variation in the level of liquid in the column corresponds to a greater variation in the outlet level of the metal, and this makes it easier to stabilise the flow rate of metal in permanent operation. By way of example, some alloys of the 7075 type (aluminum, zinc, magnesium, copper base) and the 2014 type (aluminum, copper, silicon, magnesium base) have thus been treated for aeronautical use and of the 5052 type (aluminum, magnesium, manganese base) for food cans.

The content of inclusions in the treated metal was evaluated by measuring the residual oxygen concentration. In each case, the oxygen content found is not very different from the limit detected by the method adopted (quantitative analysis by neutron activation) which is 0.5 ppm while the initial contents of the alloys before treatment varied between 4 and 10 ppm.

Irrespectively of the total oxygen content, the number and the size of the inclusions should also be considered. In fact, a very low oxygen content could correspond to a very small number of large sized inclusions which could have a disastrous effect on the characteristics of the metal. It seems that all the inclusions, whatever their size, and even the ones known as "ultimate" inclusions can be removed by carrying out the invention.

Moreover, the interchangeable cartridge system allows perfectly continuous operation. It is sufficient to arrange two filtering cartridges which are used simultaneously in the foundry ladle. When the first cartridge is not being used owing to saturation or blockage, it is sufficient to direct the metal originating from the smelting furnace toward the second one, while the first one is put back into operation.

In the case of semi-continuous casting, it is preferable to keep the filtration column at its working temperature in the interval between each casting operation by any auxiliary heating means.

The implementation of the invention, as it has just been described, has allowed the content of inclusions to be reduced very substantially but, in addition, it has brought about a significant reduction in the amount of waste in all the products obtained from metals and alloys treated in this way.

What is claimed is:

1. A device for the treatment of a molten metal by means of solid and liquid metal halide-based flux, comprising:
   a vertical column having an upper inlet end and a lower outlet end and containing a complex treatment bed comprising a packing of granules, at least in part comprising solid flux, immersed in a bath of liquid flux, the melting point of the solid flux being higher than the melting temperature of the liquid flux and the temperature of the metal which is to be treated;
   means supporting said complex bed upstream of the column outlet end for providing a molten metal droplet coalescene zone therebeneath;
   means provided at the upper end of the column for introducing molten metal to be treated into the column;
   a molten metal extraction siphon in communication with the outlet end below said support means; and
   said siphon having a cross-section smaller than that of the cross-section of the column, said siphon having an outlet orifice intermediate the lower and upper ends of the complex bed, said positioning of said siphon outlet having a difference of level relative to the level of the inlet of the column whereby the volumetric capacity of the siphon is at least equal to the volumetric loss of charge undergone by the molten metal as it passes through the column.

2. A device for the treatment of a molten metal according to claim 1 and further comprising a detachable interchangeable cartridge for containing the flux bed and which can be inserted into the column.

3. A device for the treatment of a molten metal according to claim 1 and further comprising means for blocking material movement disposed on the lower portion of the cartridge.

4. A device for the treatment of a molten metal according to claim 1 and further comprising means disposed at the top of the column for monitoring the intake of molten metal.

5. A device for the treatment of a molten metal according to claim 1 wherein the means for introducing the molten metal into the column comprises a number of holes of small diameter formed in the upper portion of the column.

6. A device for the treatment of a molten metal according to claim 1 and further comprising means for introducing the molten metal into the column under protection from air.

7. A device for the treatment of a molten metal according to claim 1 and further comprising means for introducing the molten metal into the column under the cover of inert gas.

* * * * *